Feb. 4, 1936.  A. F. W. RUSKE  2,029,392
ROLLER SKATE
Filed Sept. 11, 1933
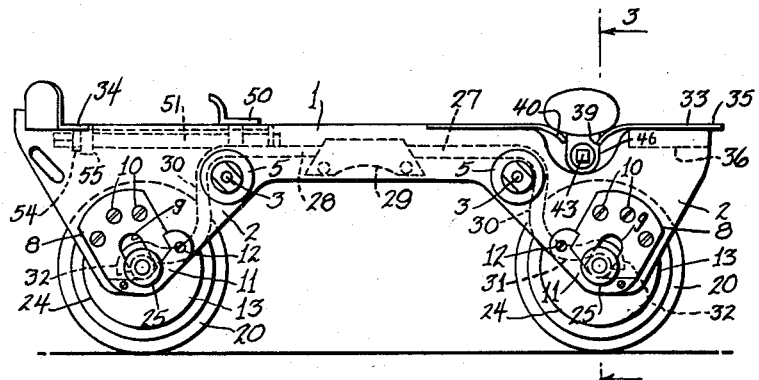
Fig. 1.
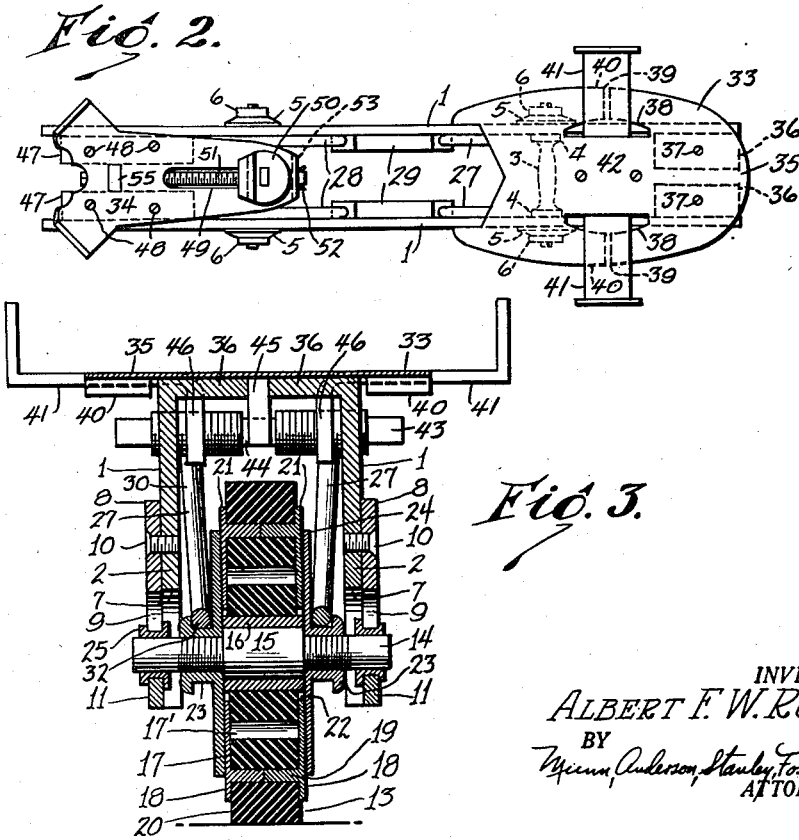
INVENTOR.
ALBERT F. W. RUSKE Patented Feb. 4, 1936

2,029,392

UNITED STATES PATENT OFFICE 2,029,392

ROLLER SKATE

Albert Frederick William Ruske,
San Francisco, Calif.

Application September 11, 1933, Serial No. 689,023

5 Claims. (Cl. 208—173)

The present invention relates to improvements in roller skates, and the present application is a continuation in part of my copending application, Serial No. 645,483 filed December 2, 1932, for Letters Patent on a resilient wheel.

The principal object of the present invention is to provide a roller skate in which the wheels are mounted resiliently so as to yield to foot pressure, while means are provided for yieldingly opposing such movement of the wheels. A further object of the invention is to simplify the construction of a roller skate, and to provide structural features which allow parts thereof to be easily removed for repair purposes.

In my copending application, I describe a resilient wheel with a rubber tire, and since a rubber tire calls for occasional renewal, it is one of the particular objects of the present invention to provide means which allows the wheels to be readily removed for the purpose of substituting new tires.

Further advantages and objects of my invention will appear as the specification proceeds.

The preferred form of my invention is illustrated in the accompanying drawing, in which Figure 1 shows a side elevation of my roller skate;

Figure 2 a top plan view of the same; and

Figure 3 a vertical section taken along line 3—3 of Figure 1.

While I have described only the preferred form of my invention I wish to have it understood that various changes or modifications may be made within the scope of the claims hereto attached without departing from the spirit of the invention.

In its preferred form my invention comprises two side plates 1 similar in form, each of the side plates being provided with substantially V-shaped downward projections 2, in the front and rear sections respectively. The two sides plates are connected by suitable spacing members 3 having shoulders 4 bearing against the inner faces of the side pieces and washers 5 bearing against the outer faces, while nuts 6 threaded upon the outer end of the spacing members urge the washers upon the side pieces.

The V-shaped projections 2 are formed with outwardly inclined slots 7, and over the slotted portions of the projections are provided small plates 8 having similar slots 9 of slightly less width, the plates 8 being secured to the side pieces by means of a number of screws 10. The slots 7 are open at the bottom and the slots 9 are closed, after insertion of the wheel axles which will be referred to later, by means of keepers 11 secured to the side pieces by means of screws 12.

The wheels 13 of the present invention are made substantially in accordance with the teachings of my copending application Serial No. 645,483, and comprise an axle 14 having an enlarged central portion 15, a hub 16 fitting on the central portion, a body of live rubber 17 encircling the hub 16, and provided with a series of holes 17', two discs 18 engaging the rubber support and the hub on opposite sides and having inwardly turned flanges 19 which encircle the rubber support and meet in the center to form a bed for the tire 20, the discs extending beyond the flanges 19 as at 21 to provide side supports for the tire. The discs 18 are formed with central openings 22 made sufficiently large to provide a certain amount of play relative to the bushing 16. The axle 14 has also mounted thereon two grooved collars 23 formed with extended inner flanges 24 bearing against the discs 18 for holding the latter in place, the said collars being threaded on the axle until they strike the enlarged portion and the hub and at that time having a sliding fit with the disc 18.

A second set of grooved collars 25 is provided on the outer ends of the axle 14, and these collars ride in the slots 9 of the plates 8.

For urging the axles 14 toward the bottom ends of the slots I provide a pair of springs 27, each spring comprising a substantially straight central portion 28 which is fastened to the inner face of its respective side piece by means of a slip 29, and the end portions which are curved downwardly at 30 to pass around the spacing members, continue downwardly to substantially the elevation of the axles, then turn again forwardly or rearwardly respectively as at 31, and terminate in a hook 32 overlying the collar 23 and fitting into the groove of the latter. The tendency of each spring end is to urge each axle toward the bottom of the slot against the weight of the body resting on the skate, which tends to move the skate downward and to urge the axle toward the top of the slot.

For supporting the foot, I provide a sole rest 33, and a heel rest 34. The sole rest is in the form of a thin plate 35 corresponding substantially to the shape of the sole and supported on the upper edges of the side pieces and inwardly extending flanges 36 to which it is secured by means of screws 37. In the central portion of the sole piece I provide spaced longitudinal slots 38, and in the material lying outside the slots I provide slits 39 whereby tongues 40 are formed which may be bent downwardly slightly to allow two gripping elements 41 to be introduced over the tongues and underneath the central portion 42 disposed between the slots 38, the gripping members being actuated in the conventional manner by means of a double-threaded screw 43 having a central unthreaded portion 44 revolvably mounted in a bearing 45 suspended from the central portion 42 and engaging with flanges 46 for moving the gripping members outwardly or inwardly when the threaded member 43 is turned.

The heel piece 34 is supported on the rear end of the skate, the principal part of the load being taken by two inwardly extending flanges 47 to which the heel piece is secured by means of screws 48. The heel piece is formed with a slot 49 having a heel grip 50 movable therein, and the heel grip is operated by means of a threaded rod 51 threadedly engaging the heel grip and held against endwise motion by a cotter pin 52 bearing against the flange 53 of the heel piece and a shoulder 54 bearing against a bridging member 55 disposed between the flanges 47.

The manner in which my skate operates will be readily understood from the foregoing description. For fastening the skate to the foot the front gripping members 41 and the heel gripping member 50 are adjusted upon the sole and the heel of the foot by operation of the threaded member 43 and the threaded rod 51 respectively.

When a person stands upon the skate his weight will tend to urge the body portion downward and to cause the axles of the wheels to ride upward in the inclined slots, which movement is opposed by the springs 27. While the person is skating there will thus be a continuous yielding action depending upon the particular pressure employed, and the skater will actually ride as on springs. In addition to the spring action there is the cushioning effect of the live rubber incorporated in the wheel itself and that of the solid tire arranged around the periphery of the wheel.

I claim:

1. A roller skate comprising a foot rest, a pair of side pieces supporting the same and having registering front and rear slots therein, the front slots being forwardly inclined in an upward direction and the rear slots being rearwardly inclined in an upward direction, wheels having axles, grooved collars on the axles and being slidable in the slots and spring means urging the wheels toward the lower ends of the slots.

2. A roller skate comprising a foot rest, a pair of side pieces supporting the same and having registering front and rear slots therein, the front slots being forwardly inclined and the rear slots being rearwardly inclined, wheels having axles, grooved collars on the axles and being slidable in the slots, and a spring for each side piece having a central portion secured to a central portion of the side piece and having end portions urging the wheels toward the lower ends of the slots.

3. A roller skate comprising a foot rest, a pair of side pieces supporting the same and having registering front and rear slots therein, wheels having axles, collars mounted on the axles and being slidable in the slots, and a spring for each side piece having a central portion secured to a central portion of the side piece and having end portions operatively connected to the axles for urging the same toward the lower ends of the slots.

4. A roller skate comprising a foot rest, a pair of side pieces supporting the same and having registering front and rear slots therein, wheels having axles, collars mounted on the axles and being slidable in the slots, a second set of collars mounted on the axles, and a spring for each side piece having a central portion secured to a central portion of the side piece and having end portions riding in the second set of collars for urging the axles toward the lower ends of the slots, said springs cooperating with the second set of collars for preventing lateral movement of the axle with respect to the skate.

5. A roller skate having vertical sides with inclined slots, wheels having axles, collars mounted on the axles and being slidable in the slots, a second set of spring receiving collars mounted on the axles, and having grooves therein, and springs carried by the skate and bearing against the second sets of collars, said springs having their ends received in the grooves and preventing lateral movement of the axle with respect to the skate.

ALBERT FREDERICK WILLIAM RUSKE.